(12) United States Patent
Fulton et al.

(10) Patent No.: US 7,596,781 B2
(45) Date of Patent: Sep. 29, 2009

(54) REGISTER-BASED INSTRUCTION OPTIMIZATION FOR FACILITATING EFFICIENT EMULATION OF AN INSTRUCTION STREAM

(75) Inventors: Mike S. Fulton, Maple Ridge (CA); Ali I. Sheikh, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 11/549,718

(22) Filed: Oct. 16, 2006

(65) Prior Publication Data

US 2008/0091923 A1 Apr. 17, 2008

(51) Int. Cl.
*G06F 9/455* (2006.01)
(52) U.S. Cl. .......................... 717/137; 703/26; 712/227
(58) Field of Classification Search ......... 717/136–161; 703/26, 27; 712/227
See application file for complete search history.

(56) References Cited

U.S. PATENT DOCUMENTS 4,514,803 A * 4/1985 Agnew et al. ................. 703/26
6,031,992 A 2/2000 Cmelik et al. ............... 395/705
2004/0054993 A1 3/2004 Nair et al. .................... 717/138
2004/0078186 A1 4/2004 Nair et al. ..................... 703/27

* cited by examiner

*Primary Examiner*—William M Treat
(74) *Attorney, Agent, or Firm*—John E. Campbell; Kevin P. Radigan, Esq.; Heslin Rothenberg Farley & Mesiti, P.C.

(57) ABSTRACT

A register-based instruction optimization is provided for facilitating efficient emulation of a target instruction stream. The optimization includes for at least one instruction in a frequently executed sequence of target instructions: confirming that at least one register is marked as a read-only register for the sequence; confirming that each register of the at least one register has been detected to have a constant value for the at least one instruction in multiple prior iterations of the executed sequence; and response thereto, optimizing the at least one instruction by replacing the at least one instruction with at least one immediate form instruction having at least one constant value encoded directly therein from the at least one register. The optimization results in an optimized sequence of target instructions, which when translated into a sequence of host instructions, is more efficiently executed by a host computing environment.

7 Claims, 8 Drawing Sheets fig. 1 fig. 2A fig. 2B fig. 3 fig. 4 fig. 5 fig. 6 fig. 7

REGISTER-BASED INSTRUCTION OPTIMIZATION FOR FACILITATING EFFICIENT EMULATION OF AN INSTRUCTION STREAM

TECHNICAL FIELD

The present invention relates generally to a computer system and method, and more particularly, to a method (and system) for increasing the efficiency of and accelerating system performance when emulating an instruction stream written for one computing environment on another.

BACKGROUND OF THE INVENTION

A major motivation for emulation is to allow instructions streams written for a particular architecture to execute on another architecture, with minimum loss of performance. Clearly then, the efficiently of the emulation process and the quality of the resulting "host" instruction sequence are of paramount importance.

Typically, a computing system includes several portions, including the processors, the memory, and the input/output devices. It is often necessary to emulate the behavior of one computing system on another. One of the principal reasons for emulation is to enable programs written for a system (e.g., the "target computing system"), to perform with the same results on another system (e.g., the "host computing system").

The need for emulating the behavior of one computer system one another has long been recognized. Numerous schemes have been proposed for doing this. A summary of certain of these techniques appears in U.S. Pat. No. 6,031,992 to Cmelik et al. U.S. Pat. No. 6,031,992 discloses a combined hardware/software scheme to perform emulation of an instruction set of one processor on another processor. This scheme allows the hardware design to incorporate features that facilitate the execution of the target instruction set. For the same reason, however, this approach cannot emulate all systems equally efficiently.

SimOS and SimICS are emulator examples that can emulate without special hardware features. However, their performance may not be as effective as that of the method and structure of U.S. Pat. No. 6,031,992.

In general, these systems employ various levels of translation. For example, "Alpha Runs x86 Code with FX!32", Jim Turley, Mar. 5, 1996, Microprocessor Report, describes techniques where the extent of translation is varied according to the extent of execution of the code.

In conventional emulation methods and techniques, various levels of translation may be employed to enhance the performance of the host instructions produced by the emulator. However, notwithstanding existence of these techniques, there remains need for improvement.

With an emulation approach which includes a combination of interpretation and translation, each target instruction is interpreted, a simple heuristic is employed to record frequency of execution of instruction groups, and when a threshold condition is satisfied, that group is scheduled for translation by placing it in a translation pool. This technique allows the interpretation process to proceed in parallel with the translation process, and so the translator may deploy fairly aggressive optimization techniques.

Emulation with translation amortizes the cost of optimization, and is effective for longer running, frequently executed instruction sequences. Various optimization techniques are known in the art of emulation with translation. However, additional optimizations are deemed desirable to further facilitate the process.

SUMMARY OF THE INVENTION

The shortcomings of the prior art are overcome and additional advantages are provided through the provision of a method of facilitating emulation of a target instruction stream. The method includes, for instance, selectively optimizing at least one instruction of a frequently executed sequence of target instructions prior to translation of the frequently executed sequence of target instructions to a sequence of host instructions directly executable by a host computing environment. The selectively optimizing includes for the at least one instruction: confirming that at least one register of the host computing environment is marked as a read-only register for instructions of the frequently executed sequence of target instructions; confirming that each register of the at least one register has been detected to have a constant value for the at least one instruction in multiple prior iterations of the frequently executed sequence of target instructions; and responsive thereto, optimizing the at least one instruction by replacing the at least one instruction with at least one immediate form instruction having at least one constant value obtained from the at least one register directly encoded therein, wherein the selectively optimizing results in replacing the frequently executed sequence of target instructions with an optimized sequence of target instructions.

In an enhanced embodiment, the at least one register includes at least one address register, and the selectively optimizing further includes confirming that the at least one instruction reads a write-seldom page of memory via the at least one address register, and the optimizing is further responsive thereto. As a further enhancement, the method includes, for instance, generating at least one assumption test for verifying existence of a respective constant value in each register of the at least one register and associating the at least one assumption test with the optimized sequence of target instructions. The optimized sequence of target instructions with the associated at least one assumption test is then translated into a sequence of host instructions directly executable by the host computing environment (which is performing emulation of the target instruction stream). The translated sequence of host instructions is saved for future execution whenever a subsequent iteration of the frequently executed sequence of target instructions is identified in the target instruction stream and all associated assumption tests for the corresponding optimized sequence of target instructions are satisfied.

Further, the method includes, for instance, tracking occurrences of sequences of target instructions and identifying therefrom frequently executed sequences of target instructions, and tracking register values associated with respective frequently executed sequences of target instructions, and tracking pages of main memory that are written to seldomly. For each instruction in a frequently executed sequence of target instructions, the method may further include determining whether the instruction reads one or more registers, and if so, adding the one or more registers to a list of read registers, and determining whether the instruction writes one or more registers, and if so, adding the one or more registers to a list of written-to registers, wherein the method includes performing the selectively optimizing only if a frequently executed sequence of target instructions results in less than all registers being written to or at least one register being read.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Hardware architecture emulators enable applications written for one computing system environment (i.e., target computing system) to run on a different computing system environment (i.e., host computing system). Compilers are often built into these emulators to compile selected sequences of instructions from the stream of target instructions and translate them into a sequence of host instructions for direct execution on the host computing system (e.g., the system that the emulator is running on). Presented herein is a particular optimization for facilitating this compilation and translation of selected sequences of target instructions for direct execution on the host computing system. The optimization enables emulators with translation to generate better code for execution, and thereby facilitate the emulation process.

In accordance with one or more aspects of the present invention, by analyzing a target instruction sequence (instruction trace), a translator creates a set of pre-conditions (i.e., test assumptions) on the values of registers on entry to a particular instruction trace and optimizes (for example) register-based storage, arithmetic and control flow instructions of the sequence into "immediate form instructions" that require fewer runtime checks and run more efficiently on the host computing system. As used herein, "immediate form instruction" refers to an instruction of an instruction trace having one or more constant values directly encoded therein obtained from one or more registers.

Figure 1:
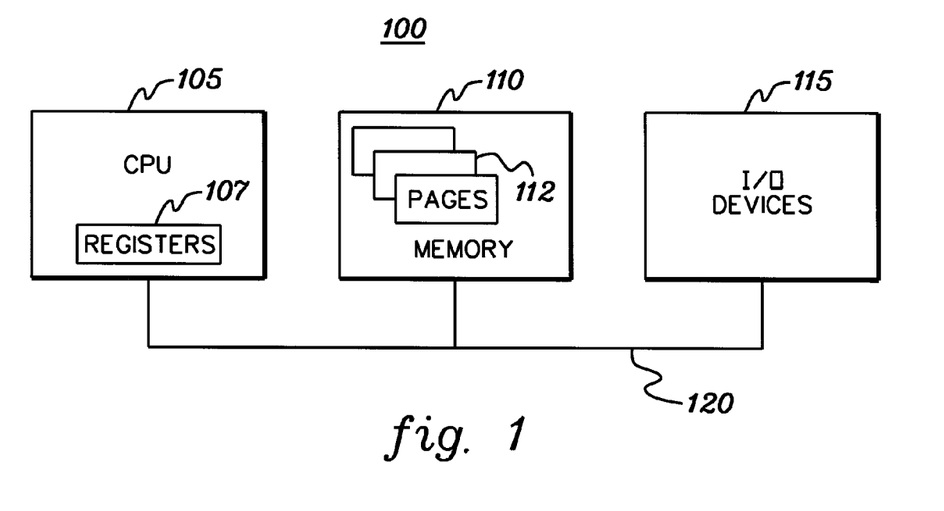
FIG. 1 depicts one embodiment of a host computing system to perform emulation with translation employing optimization, in accordance with an aspect of the present invention.

One embodiment of a host computing environment 100 incorporating and using one or more aspects of the present invention is depicted in FIG. 1. Computing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-04, $5^{th}$ Edition, September 2005, which is hereby incorporated herein by reference in its entirety. (IBM® is a registered trademark of International Business Machines Corporation, Armonk, N.Y., U.S.A. Other names used herein may be registered trademarks, trademarks or product names of International Business Machines Corporation or other companies.) In one example, a computing environment based on the z/Architecture includes an eServer zSeries, offered by International Business Machines Corporation, Armonk, N.Y.

As one example, host computing environment 100 includes a central processor unit (CPU) 105, which includes multiple registers 107, which may comprise one or more address registers, as well as other non-address registers. A memory 110 (e.g., main memory) is coupled to CPU 105 via, for example, one or more buses 120. Memory 110 is divided in this example into multiple pages 112. By way of specific example, in an eServer zSeries computing environment, each page might comprise four kilobytes of memory. One or more input/output (I/O) devices 115 are also coupled to the one or more buses 120.

Figure 2A:
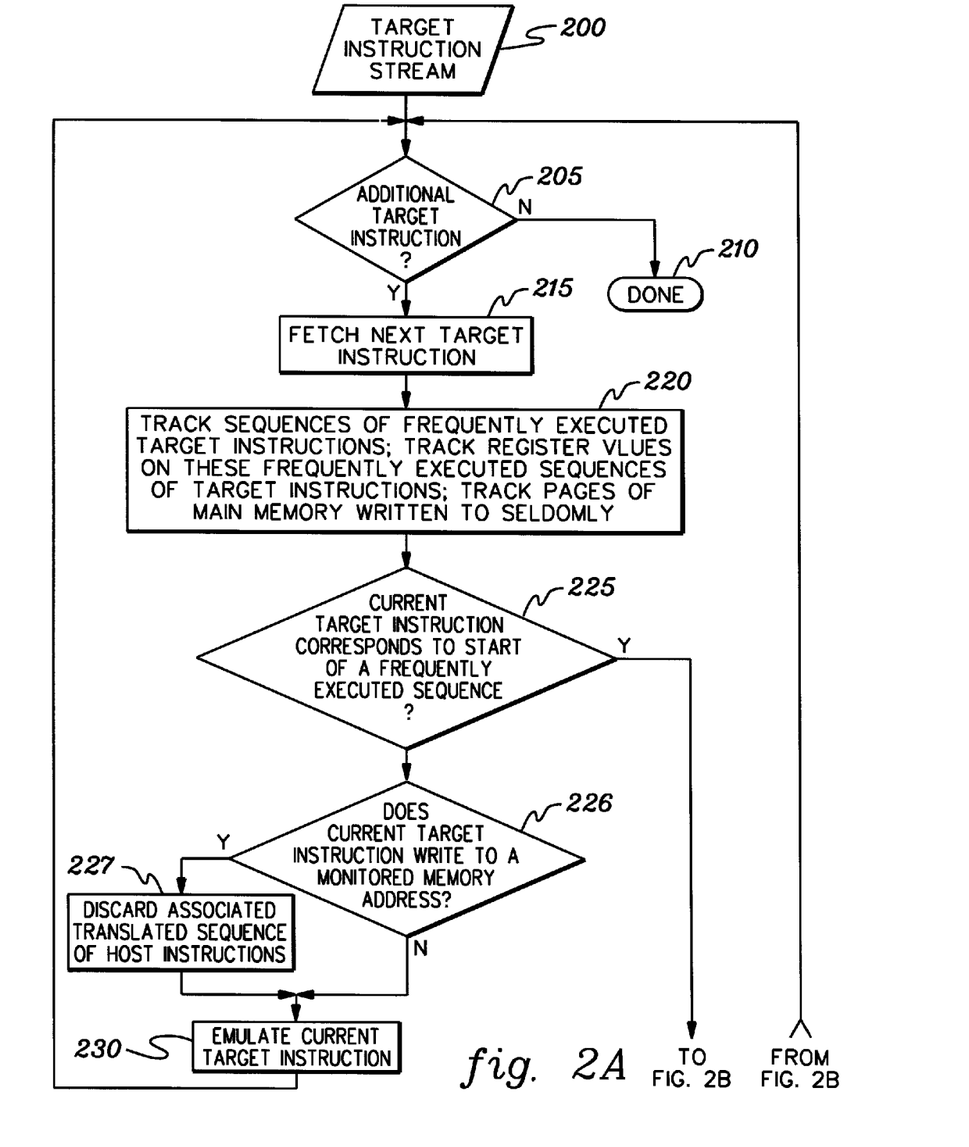
FIGS. 2A & 2B are a flowchart of one embodiment of an emulation with translation approach which is to employ optimization, in accordance with an aspect of the present invention.
Figure 2B:
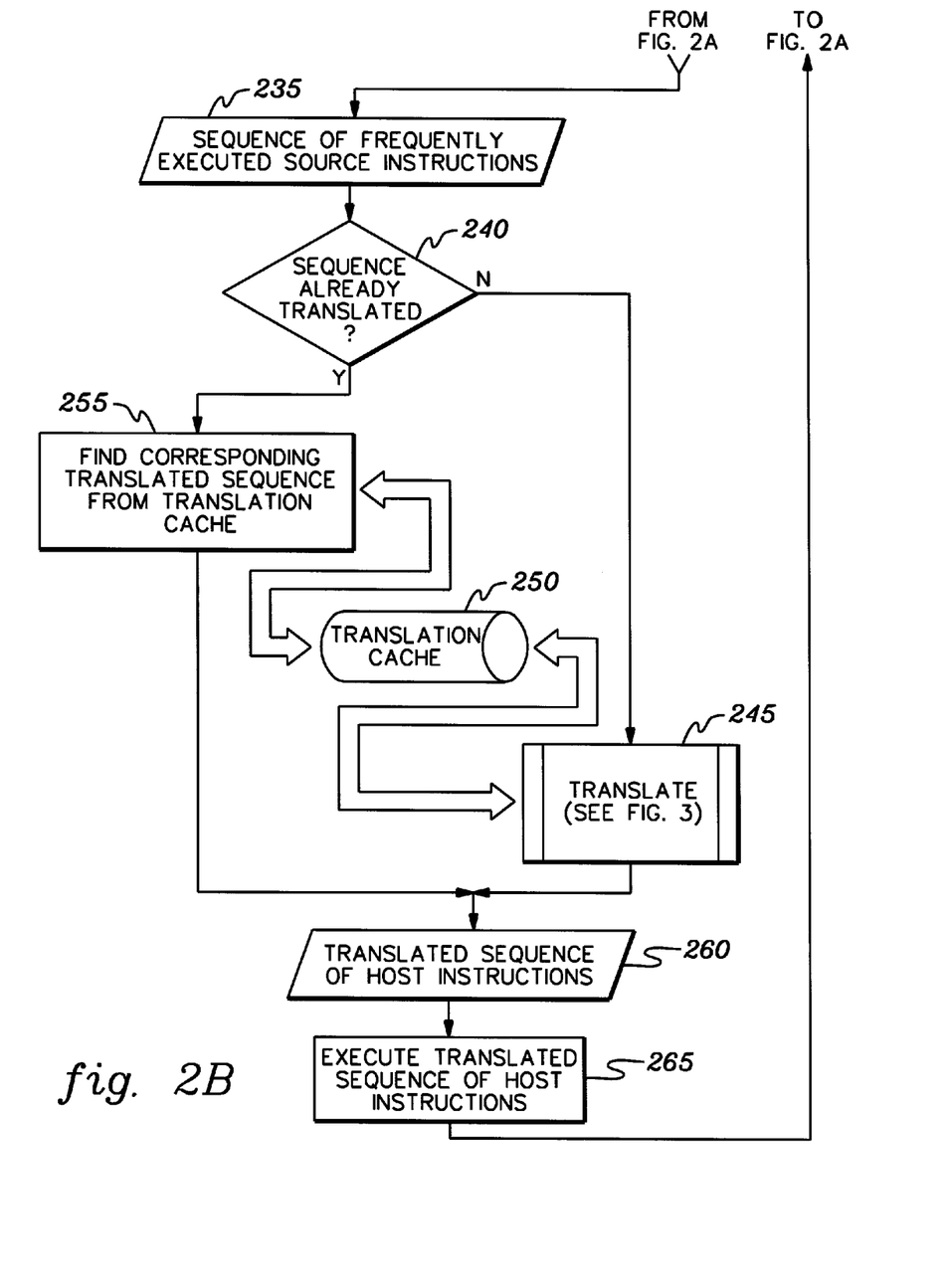

FIGS. 2A & 2B depict one embodiment of an emulation process with binary translation, modified to facilitate instruction optimization, in accordance with an aspect of the present invention. Numerous emulators with binary translation capabilities are available in the art. For example, reference the "Dynamo" emulator with dynamic binary translation disclosed by Hewlett-Packard Company of Paolo Alto, Calif., U.S.A.; the "Digital FX! 32" emulator with dynamic binary translation, originally offered by Compaq (now Hewlett-Packard Company) (http://research.compaq.com/wrl/DECarchives/DTJ/DTJP01PF.pdf); and the various emulators with binary translation offered by VMWare, Inc. (an EMC Company), and the "QEmu" open-source emulator with dynamic binary translation described, for example, at http://fabrice.bellard.free.fr/qemu/about.html.

Referring to the emulation with binary translation flow of FIGS. 2A & 2B, a target instruction stream 200 undergoes emulation by processing determining whether there is another target instruction 205, and if so, a next target instruction is fetched 215. Otherwise, emulation processing is complete 210.

In accordance with one or more aspects of the present invention, sequences of frequently executed target instructions are tracked, as well as register values for these frequently executed target instruction sequences and pages of main memory that are written to seldom 220. This tracking is implemented (in one example) in the background within the emulation process. As a specific example, written-to-seldom pages may comprise pages of memory not written to in a last 100,000 writes to memory, or some other predefined number of writes to memory.

Processing next determines whether the current target instruction corresponds to the start of a frequently executed sequence of target instructions 225. If "no", then processing determines whether the current target instruction writes to a monitored memory address 226, and if so, discards any translated sequence of host instructions associated with that monitored memory address 227. Thereafter, or if the current target instruction does not correspond to the start of a frequently executed sequence of target instructions, the target instruction is emulated 230 and processing determines whether there is an additional target instruction to emulate 205. If the current target instruction does correspond to the start of a frequently executed sequence of target instructions, then processing determines whether the sequence of frequently executed target instructions 235 (FIG. 2B) has already been translated 240. If "no", then the sequence is optimized and translated in accordance with the process flow embodiment of FIG. 3. Once translated, the translated sequence of host instructions 260 is saved in a translation cache or database 250 of already translated instruction sequences. If the sequence has already been translated, then processing finds the corresponding translated sequence in the translation cache 255. In either case, the output is a translated sequence of host instructions 260 which is then directly executed on the host computing system 265. After executing a translated sequence of host instructions, processing determines whether there are any more target instructions to be emulated 205.

Figure 3:
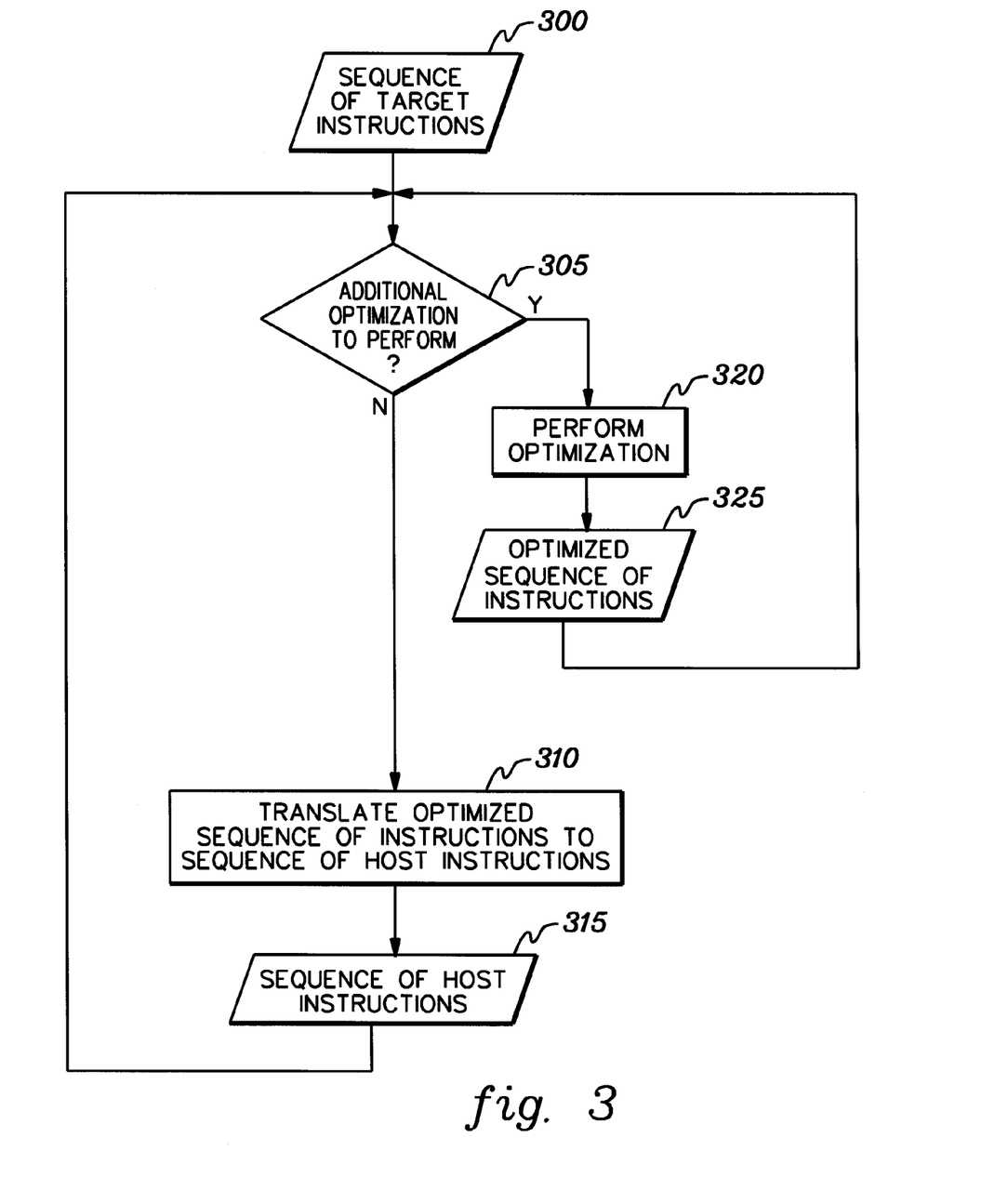
FIG. 3 is a flowchart of one embodiment of a translation approach employing one or more optimizations, in accordance with an aspect of the present invention.

As noted, FIG. 3 depicts one embodiment of optimization and translation processing employed in accordance with an aspect of the present invention. A sequence of target instructions 300 (e.g., the sequence of frequently executed instructions 235 of FIG. 2B) is initially evaluated to determine whether an optimization can be performed on the sequence 305. Various optimizations for translators are known in the art, with the optimizations typically being customized for a particular translator. One of ordinary skill in the compile and emulation art is aware of these existing optimizations. By way of example, the following optimizations are well known in the compiler art: constant propagation; algebraic simplification; loop unrolling; and common sub-expression elimination. Any one or more of these optimizations can be employed by a binary translation process of an emulator such as referenced above. If there is no additional optimization to perform, then the sequence of target instructions is translated 310 to a sequence of host instructions 315 using a conventional translation approach.

If one or more additional optimizations are to be performed 305, processing performs an optimization 320 and outputs an optimized sequence of target instructions 325, which can then undergo one or more additional optimizations. As noted, presented herein is a particular optimization for a frequently executed sequence of target instructions, which can be performed prior to translation thereof into a sequence of host instructions directly executable by the host computing system.

By way of further explanation, one or more optimizations may be desirable because (for example) instruction code run on modern computing environments may not be compiled to a latest release of the computing environment architecture. This could be for any one of several reasons. For example, a developer may not want to require that a user employ the latest computing environment hardware to run a particular application. Another reason is that a new version of the application may not have been released in the last few years, so the application is built on an older level of a computing system architecture. Additionally, new or improved hardware instructions such as relative load, store, arithmetic and branch instructions may not have been employed in a given application (i.e., in the target instruction stream). Given this situation, it is often desirable to optimize an instruction trace when feasible. The present invention discloses one such optimization.

As explained further below, for a given instruction trace (i.e., for a given sequence of frequently executed target instructions), the following is determined:

The values of registers at the start of the instruction trace, based on the values the emulator sees when emulating the instruction trace on previous iterations.

What registers are written-to in the instruction trace.

What registers are read in the instruction trace.

What pages of memory are written-to-seldomly.

For those registers that are only read, but not written to (either directly or indirectly), the generated code that the translator (i.e., compiler) produces can be optimized if the register-based instruction is mapped to an immediate-form instruction, which is an instruction that performs more efficiently on the host computing environment architecture, and avoids (for example) an address generation stage of the instruction computation. Again, as used herein, the phrase "immediate-form instruction" means an instruction with a constant value encoded directly in the instruction, rather than a reference to a register containing a constant value.

To accomplish this, the processing presented ensures that no other instructions on different CPUs could store into the memory locations that are being assumed to be read-only via the one or more address registers marked as read-only. Assuming that the storage locations treated as read-only are constrained as code (which is traditionally read-only except in rare cases) and literal pool areas (which are read-only data areas), then the main-memory ranges for code and literal pools can be defined as "write-seldom". These write very seldom pages can be detected by monitoring the writes to memory done by the emulator and finding pages that are not written to for a large number of write operations. These "write-seldom" areas are then monitored by the memory component of the emulator, and if they are written to, the translated code for a particular instruction trace is discarded.

A specific example of an optimized instruction trace using IBM's zSeries architecture as the target computing environment, as well as the zSeries architecture as the host computing environment is presented below:

Trace Entry:
    R3 is 0x10000000 (R3 points to the start of a code area—perhaps a function)
    PC is 0x10000100 (the first instruction of the instruction trace)
    R8 is 0x10000200 (R8 points to the literal pool—an area of read-only constants created by a compiler)

<memory range from 0x100000100 to end of 0x100000400 is marked as 'write very seldom' and will be monitored by the memory component>

L R4, 20 (, R9)

N R2, 40 (, R8) # this word of memory has the value 0x10 in it

AR R6, R2

ST R4, 30 (, R5)

BNZ 256 (, R3)

could be transformed to a more efficient sequence of:

Assumption Tests:

test that the entry register conditions match our assumptions

CL R3,=X'10000000'

BNZ SLOW

CL R8,=X'10000200'

BNZ SLOW

```
# Ensure that stores to memory done on this trace don't
  overwrite 40(,R8)
CL R5,=X'10000200'+7
BL FAST
CL R5,=X'10000200'+13
BLE SLOW

Optimized Sequence:

FAST:
L R4,20(,R9)
NI R2,=X'10'# AND immediate instruction replaces the
  AND instruction
AR R6, R2
ST R4,30(,R5)
BNZ FAST # Branch Relative instruction replaces the
  BRANCH instruction
. . .

Non-optimized Sequence:

SLOW:
L R4, 20(,R9)
N R2, 40(,R8)
AR R6, R2
ST R4,30(,R5)
BNZ 256(,R3)
```

Figure 4:
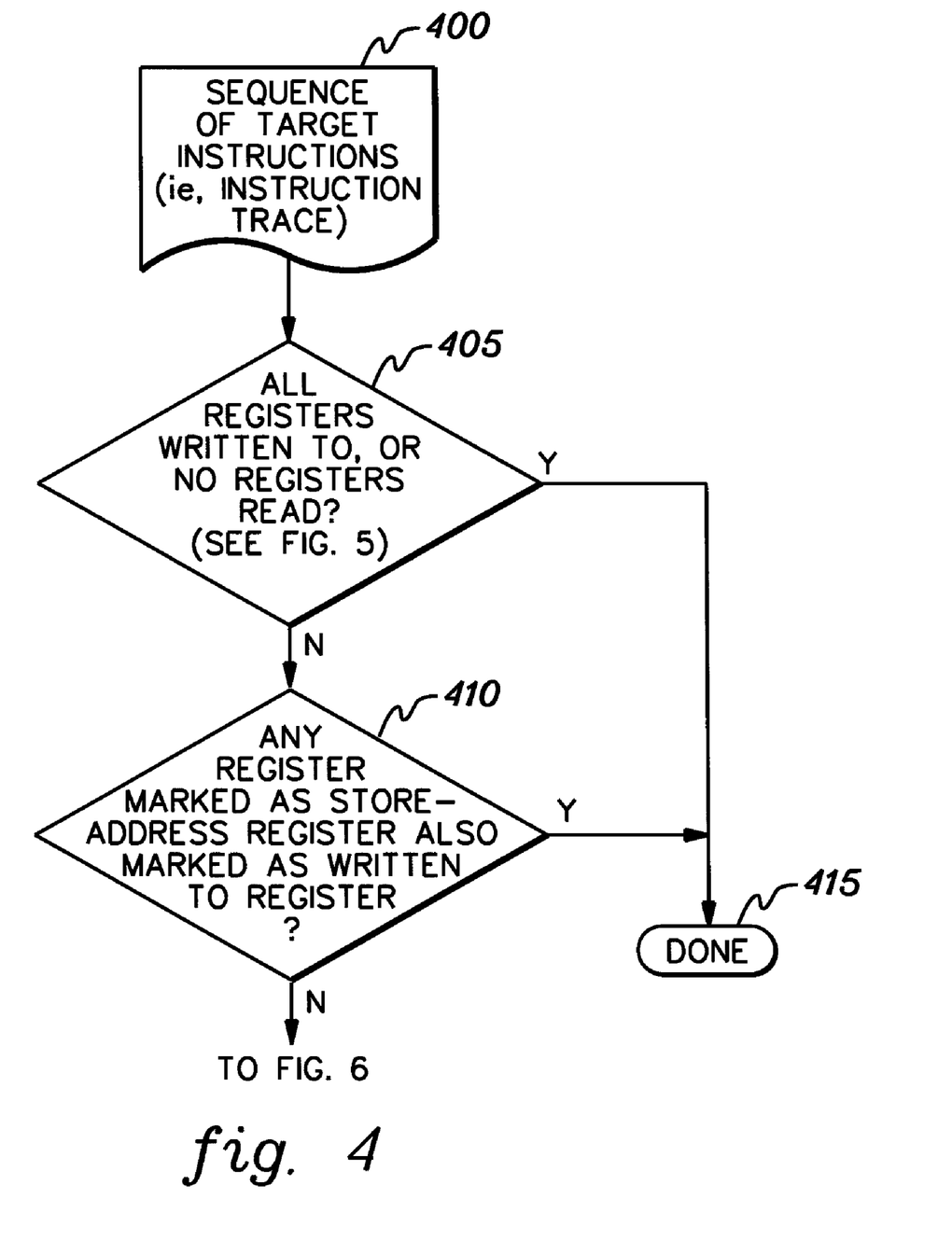
FIG. 4 is a flowchart of an initial inquiry made prior to performing an optimization, in accordance with an aspect of the present invention.
Figure 5:
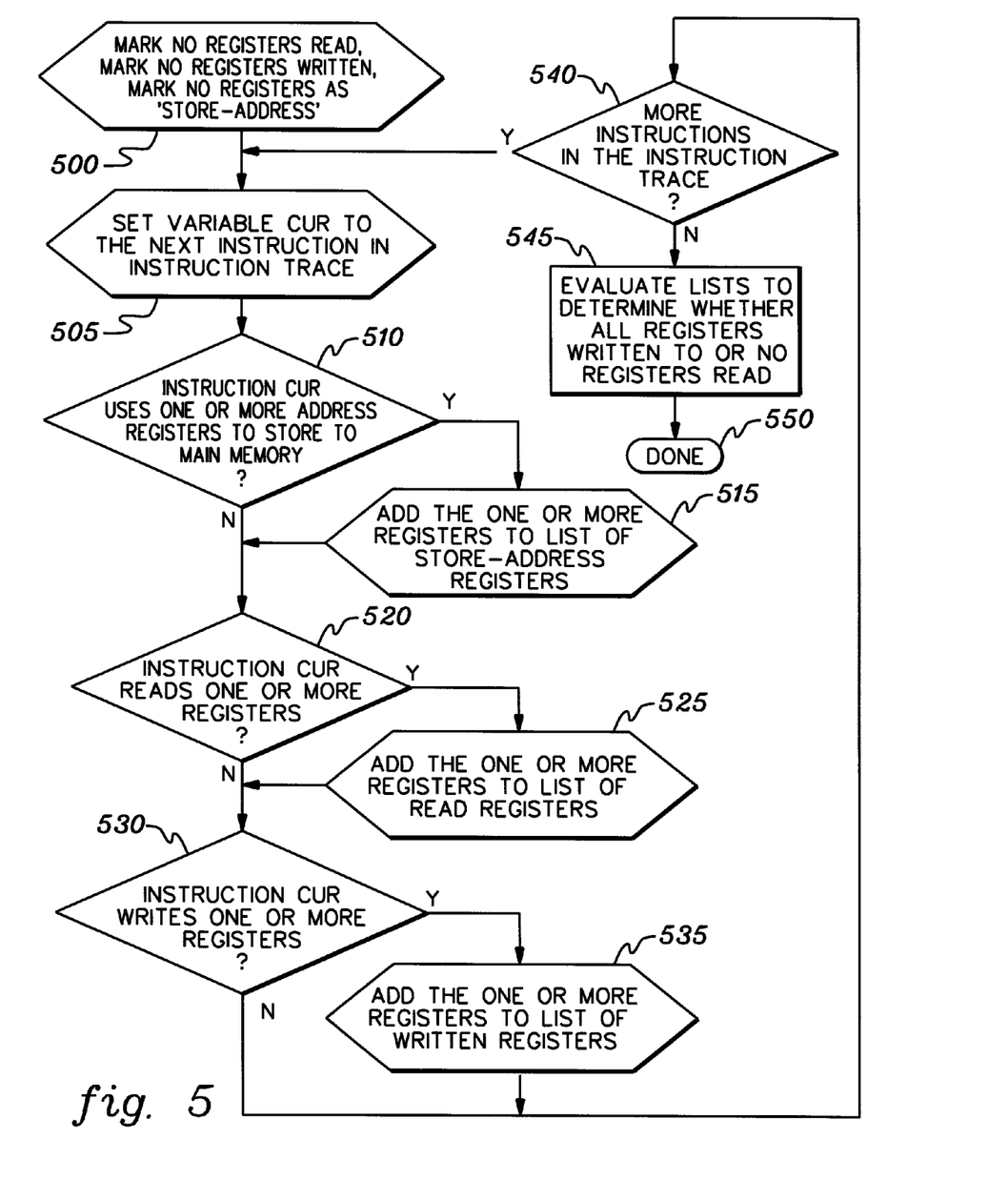
FIG. 5 is a flowchart of one embodiment of processing for performing the initial inquiry of FIG. 4, in accordance with an aspect of the present invention.
Figure 6:
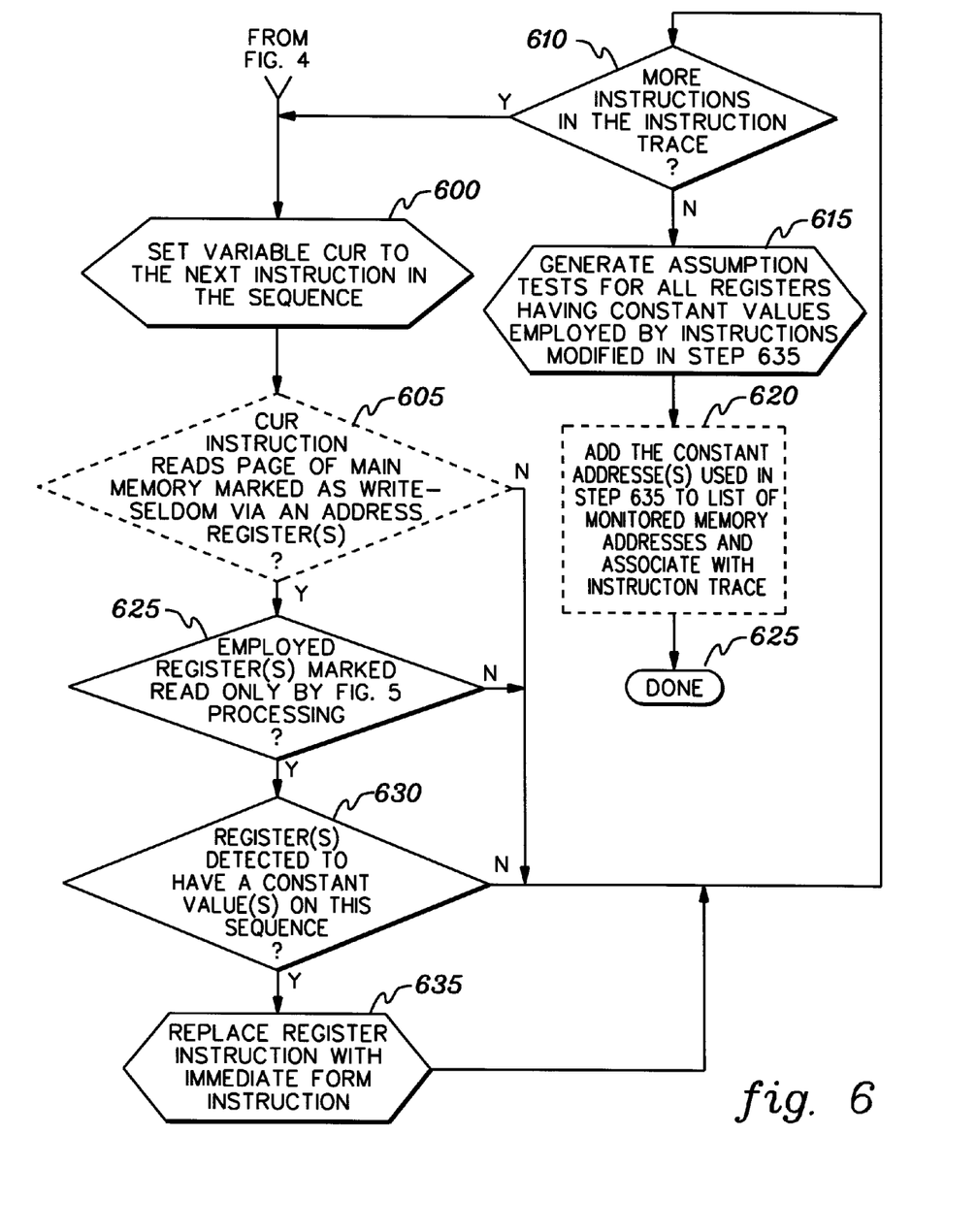
FIG. 6 is a flowchart of one embodiment of a register-based instruction optimization for facilitating instruction translation and subsequent execution, in accordance with an aspect of the present invention.

FIGS. 4-6 depict one embodiment of instruction optimization processing prior to translation, in accordance with an aspect of the present invention. Referring first to FIG. 4, a frequently executed sequence of target instructions (i.e., instruction trace) 400 such as illustrated above is obtained. For the instruction trace, processing determines whether all registers are written to or no register is read 405. If "yes", optimization processing in accordance with one or more aspects of the present invention is unsuccessful 415 and processing returns to the flow of (for example) FIG. 3. Otherwise, processing determines whether any register marked as a store-address register is also marked as a written-to register 410. If so, optimization processing in accordance with one or more aspects of the present invention is unsuccessful 415 and processing returns to the flow of, for example, FIG. 3. Otherwise, processing continues with the flow of FIG. 6 (described further below).

FIG. 5 illustrates one embodiment of processing to determine whether all registers have been written to or no register has been read or any register is a store-address register. Initially, processing marks no registers read, no registers written, and no registers store-address registers 500. A variable Cur is set to the next instruction in the instruction trace 505, and processing determines whether the Cur instruction uses one or more address registers to store to main memory 510. If "yes", then the one or more registers are added to a list of store-address registers 515. Next, processing determines whether the Cur instruction reads one or more registers 520. If "yes", then the one or more registers are added to the list of read registers 525. Next, processing determines whether the Cur instructions writes one or more registers 530. If "yes", then the one or more registers are added to the list of written-to registers 535. Thereafter, processing determines whether there are more instructions in the instruction trace 540, with the process repeating for each instruction in the instruction trace. Once all instructions have been considered, processing evaluates the list to determine whether all registers have been written to or no registers have been read 545 for this instruction trace, which completes the inquiry 550.

Assuming that not all registers are written-to or at least one register is read, then processing continues as illustrated in FIG. 6. In particular, the variable Cur is set to a first or next instruction in the instruction trace 600 and processing determines whether the Cur instruction reads a page of main memory marked as write-seldom via an address register 605. If "no", and if the Cur instruction only employs one or more address registers, then processing determines whether more instructions are in the instruction trace 610, and if "yes", processing loops back for a next instruction of the instruction trace.

Assuming that the Cur instruction reads a page of main memory marked as write-seldom via at least one address register, or employs one or more non-address registers, processing determines whether the at least one register is marked as a read-only register by the processing of FIG. 5 for the instruction trace 625. If "no", then processing determines whether there is a next instruction in the instruction trace to be processed 610. Otherwise, processing determines whether the at least one register is detected to have a constant value for this Cur instruction in multiple prior iteration of the instruction trace 620. If "no", processing proceeds to a next instruction of the instruction trace. If "yes", meaning that the current instruction employs one or more registers to read a main memory page marked as write-seldom, the one or more registers referenced are marked read-only, and the one or more registers have been detected to have a constant value for the instruction trace over prior iterations thereof, then processing replaces the register instruction with an immediate-form instruction, wherein one or more constant values obtained from (or via) the one or more registers employed are directly encoded therein 635.

Once all of the instructions in the instruction trace have been considered, then one or more assumption tests are generated for each register employed in an immediate form instruction of step 635. The assumption tests are generated to perform at least two different types of checks; that is, to ensure that a register contains the same value as was detected at the time of translation of the current instruction trace, and to ensure that no write-to-memory performed by current traces overlaps with regions of memory assumed to be write-seldom by this instruction trace. As a specific example, the following assumption tests may be generated:

```
# Assumption Tests:
test that the entry register conditions match our assumptions
CL R3, =X'10000000'
BNZ SLOW
CL R8, =X'10000200'
BNZ SLOW
# Ensure that stores to memory done on this trace don't
  overwrite 40 (, R8)
CL R5, =X'10000200'+7
BL FAST
CL R5, =X'10000200'+13
BLE SLOW
```

The one or more assumption tests are generated and must be satisfied as a prerequisite to executing the translated code. That is, the "fast" version of the translated code obtained from the optimized instruction trace is only executed if all assumption tests for the trace are satisfied. Otherwise, the trace contains a slower version (without the optimizations) that may be executed. If an assumption test is not satisfied for a subsequent iteration of the frequently executed sequence of target instructions, then the fast version of translated code is not employed. The one or more assumption tests are, in one embodiment, prepended to the optimized instruction trace prior to translating the sequence into a sequence of host instructions directly executable on the host computing system. The assumption tests are generated at the time of initial translation of a particular sequence of frequently executed instructions, and is then referenced with each subsequent iteration of the sequence of frequently executed target instructions to be translated. The "fast" portion of the above-noted code is the faster version of the translated code with the optimization of the example described above. After prepending the one or more assumption tests to the instruction trace, and assuming the Cur instruction employs one or more address registers, then any constant address(es) used in step 635 is added to a list of monitored memory addresses and associated with the current instruction trace 620. This completes 625 the optimization processing of FIGS. 4-6. The optimized instruction trace is returned, for example, for translation via one or more existing translators such as described above in connection with the processing of FIG. 3.

One or more aspects of the present invention can be included in an article of manufacture (e.g., one or more computer program products) having, for instance, computer-usable media. The media has therein, for instance, computer readable program code means of logic (e.g., instructions, code, commands, etc.) to provide and facilitate the capabilities of the present invention. The article of manufacture can be included as part of a computer system or sold separately.

Figure 7:
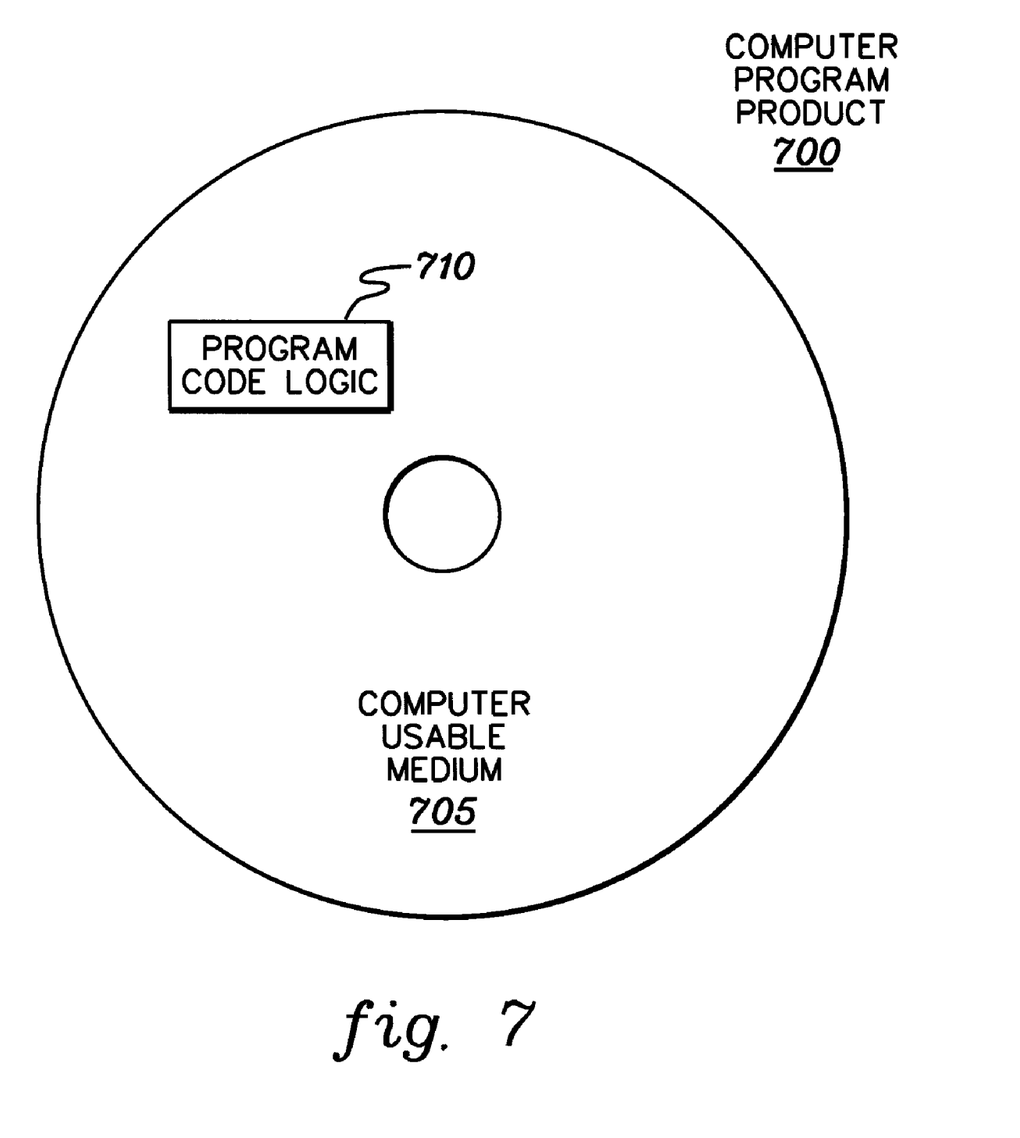
FIG. 7 is a representation of a computer program product incorporating one or more aspects of the present invention.

One example of an article of manufacture or a computer program product incorporating one or more aspects of the present invention is depicted in FIG. 7. A computer program product 700 includes, for instance, one or more computer-usable media 705 to store computer readable program code means or logic 710 thereon to provide and facilitate one or more aspects of the present invention. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disc and an optical disc. Examples of optical discs include compact disc read-only memory (CD-ROM), compact disc-read/write (CD-R/W), and DVD.

A sequence of program instructions or a logical assembly of one or more interrelated modules defined by one or more computer readable program code means or logic direct the performance of one or more aspects of the present invention.

Moreover, a computing environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are provided by way of example. There may be many variations to these diagrams or the steps (or operations) described therein without departing from the spirit of the invention. For instance, certain steps may be performed in a differing order, or steps may be added, deleted, or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention, and that these are therefore considered to be within the scope of the invention as defined in the following claims.

What is claimed is:

1. A method of facilitating emulation of a target instruction stream, the method comprising:
    selectively optimizing at least one instruction of a frequently executed sequence of target instructions prior to translation of the frequently executed sequence of target instructions to a sequence of host instructions directly executable by a host computing environment, the selectively optimizing comprising for the at least one instruction:
    (i) confirming that at least one register of the host computing environment is a read-only register for instructions of the frequently executed sequence of target instructions;
    (ii) confirming that each register of the at least one register has been detected to have a constant value for the at least one instruction in multiple prior iterations of the frequently executed sequence of target instructions; and
    (iii) responsive to the confirming (i) and the confirming (ii), optimizing the at least one instruction by replacing the at least one instruction with at least one immediate form instruction having at least one constant value obtained from the at least one register encoded directly therein, wherein the selectively optimizing results in an optimized sequence of target instructions.

2. The method of claim 1, wherein the at least one register comprises at least one address register, and wherein the selectively optimizing further comprises confirming that the at least one instruction reads a write-seldom page of memory via the at least one address register, the optimizing (iii) being further responsive to the confirming that the at least one instruction reads a write-seldom page of memory via the at least one address register.

3. The method of claim 1, further comprising generating at least one assumption test for verifying existence of a respective constant value in each register of the at least one register and associating the at least one assumption test with the optimized sequence of target instructions.

4. The method of claim 3, further comprising translating the optimized sequence of target instructions with the associated at least one assumption test into the sequence of host instructions directly executable by the host computing environment, wherein the host computing environment is performing emulation of the target instruction stream.

5. The method of claim 4, further comprising saving the translated sequence of host instructions for execution when a subsequent iteration of the frequently executed sequence of target instructions is identified in the target instruction stream and all associated assumption tests for the optimized sequence of target instructions are satisfied.

6. The method of claim 1, further comprising tracking occurrences of sequences of target instructions and identifying therefrom frequently executed sequences of target instructions, and tracking register values associated with respective frequently executed sequences of target instructions, and tracking pages of main memory that are written-to seldomly.

7. The method of claim 1, further comprising for each instruction in the frequently executed sequence of target instructions, determining whether the instruction reads one or more registers, and if so, adding the one or more registers to a list of read registers, and determining whether the instruction writes one or more registers, and if so, adding the one or more registers to a list of written-to registers, and wherein the method further comprises performing the selectively optimizing if the frequently executed sequence of target instructions results in less than all registers being written to or at least one register being read.

* * * * *